UNITED STATES PATENT OFFICE.

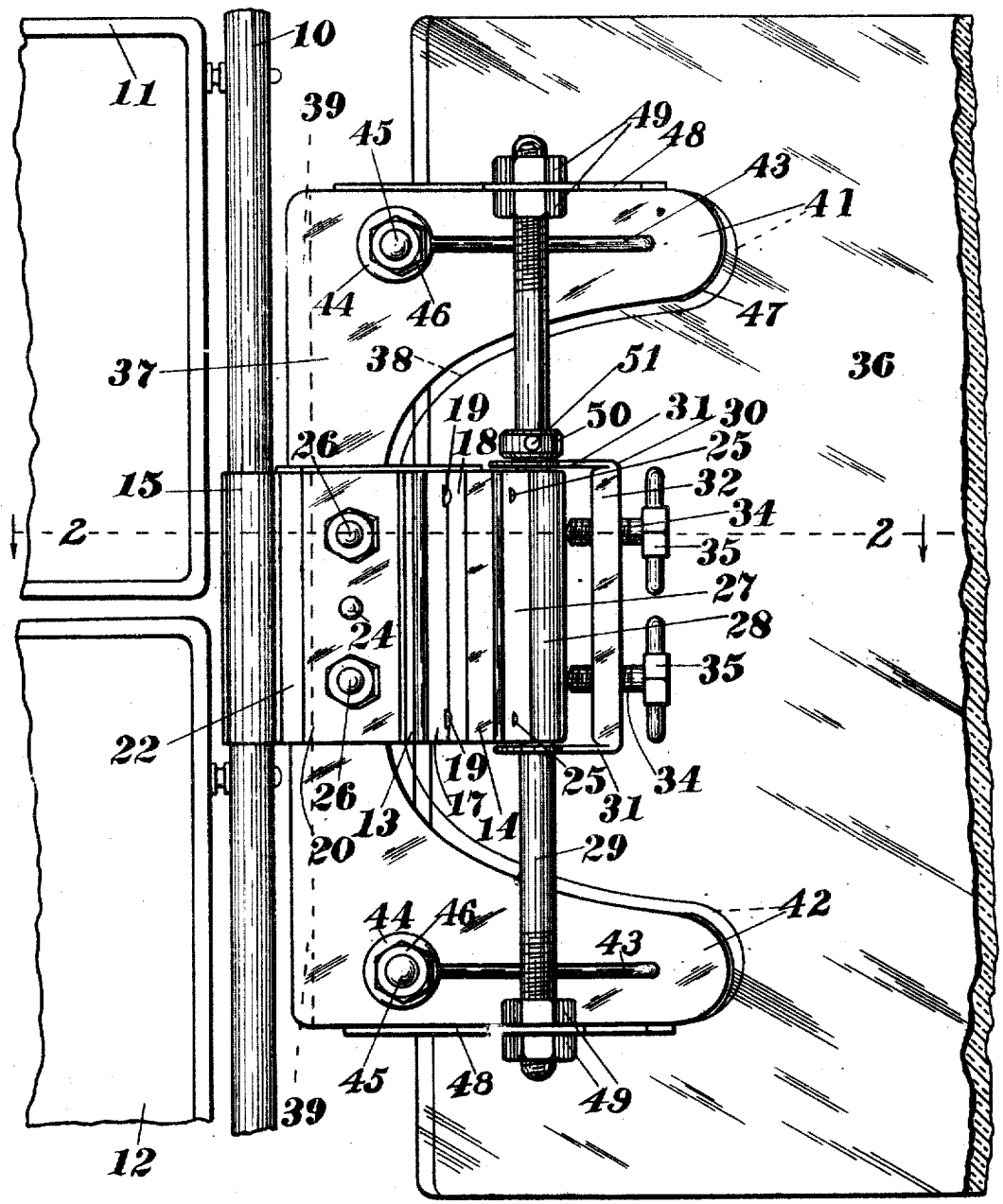

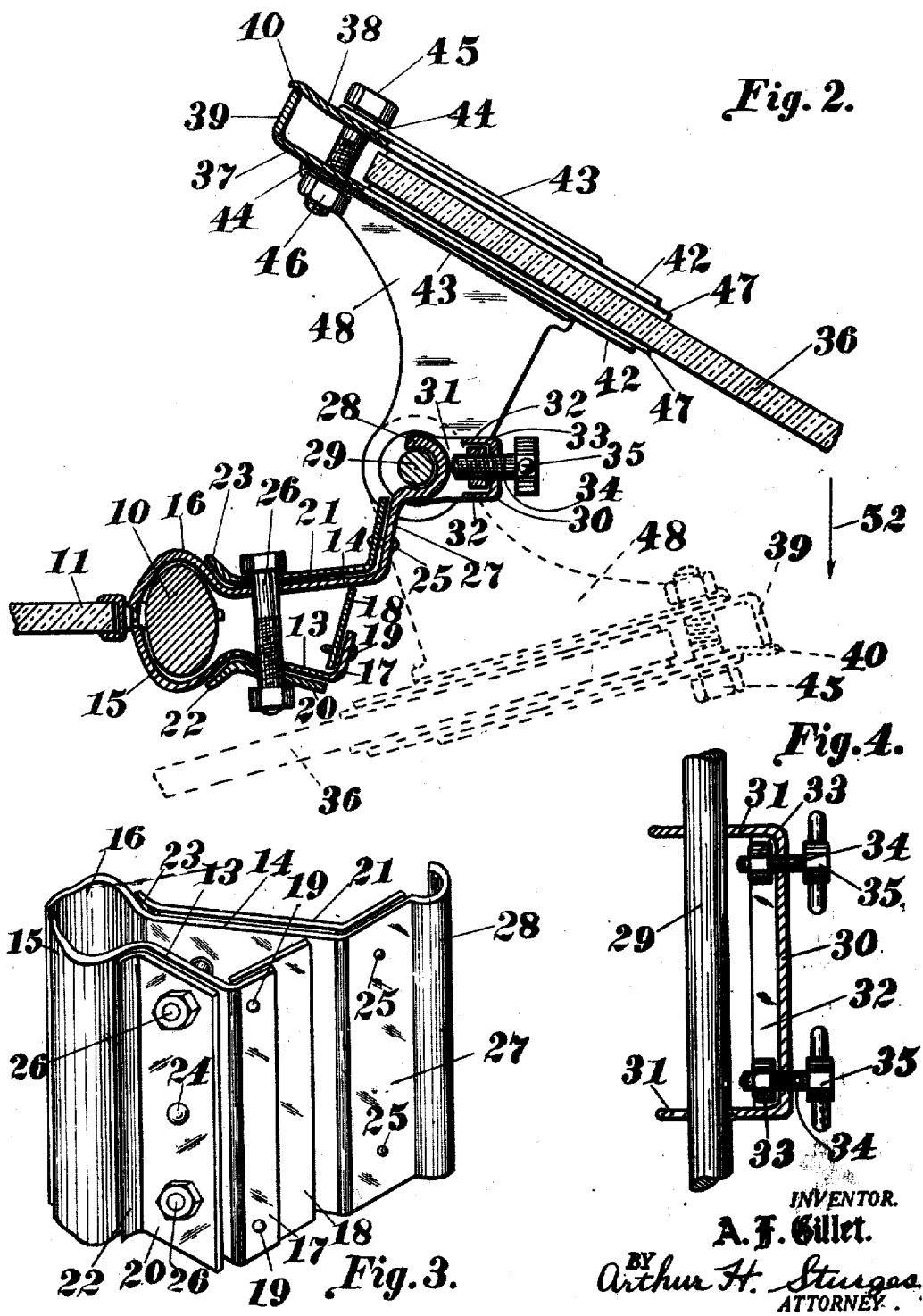

ALEXIS F. GILLET, OF OMAHA, NEBRASKA, ASSIGNOR TO JUBILEE MANUFACTURING COMPANY, OF OMAHA, NEBRASKA.

WINDSHIELD ATTACHMENT.

1,381,629.   Specification of Letters Patent.   Patented June 14, 1921.

Application filed October 16, 1920. Serial No. 417,366.

*To all whom it may concern:*

Be it known that I, ALEXIS F. GILLET, a citizen of the United States, residing at Omaha, in the county of Douglas and State of Nebraska, have invented certain new and useful Improvements in Windshield Attachments, of which the following is a specification.

The present invention relates to automobile windshield attachments in the nature of extensions or wings, and has for an object to provide a pair of such wings which are capable of adjustment not only into various angles relatively to the plane of the windshield, but also vertically into different elevated positions.

Another object of the present invention is to provide a clamping means for the wings which is adaptable to the frames of windshields of different thicknesses and constructions and which is adapted to securely hold the wings to the windshield as a part thereof.

A further object of the invention is to provide an improved clamp adapted to hold the pane of glass or other transparent body which constitutes the body portion of the wing without boring or otherwise forming holes through the glass, and which will securely maintain the glass in proper position without injury thereto and admit of easy and ready replacement upon the breakage of the wing.

A still further object of the present invention is to provide a windshield wing which may be clamped securely in its vertically and horizontally adjusted position and which may be easily released and adjusted.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation, showing fragmentarily one side of the windshield and a wing or extension constructed according to the present invention applied thereto and in position for catching air currents and deflecting the same into the body of a vehicle behind the windshield;

Fig. 2 is a horizontal section taken through the same substantially in the plane indicated by the line 2—2 in Fig. 1, the dotted lines showing one position of adjustment of the wing for deflecting wind and rain from about the sides of the windshield;

Fig. 3 is a detail perspective view of the clamp or support for attachment to the side of the windshield; and Fig. 4 is a detail sectional view taken vertically through the pivot clamp for securing the wing in various angularly adjusted positions with respect to the plane of the windshield.

Referring to the drawings, wherein like parts are designated by similar numerals of reference throughout the several views, 10 designates the upright forming one side of the windshield frame and to which is pivotally attached the upper and lower sections 11 and 12 of the body of the windshield. The showing of these parts in the drawings is conventional and is important merely for the purpose of illustrating the application of the device of this invention to windshields.

The wings or extensions of this invention are adapted to be used in pairs and as each one of the wings is of similar construction but one is illustrated. Each wing is provided with an attaching means, the same being in the form of a clamp which is shown in detail in Fig. 3 and as comprising a pair of opposed plates 13 and 14 of sheet metal or the like having complemental outwardly and oppositely arched end portions forming jaws 15 and 16. These jaws 15 and 16 are bowed outwardly on a suitable radius or curvature for clamping engagement about the opposite edge portions of the upright 10, as shown to advantage in Fig. 2.

The other end of the plate 13 has an inturned flange 17 to which is detachably connected a spacing plate 18 by screws 19 or the like. The plate 18 may be used when it is desired to space the outer ends of the plates 13 and 14 apart a considerable distance and may be removed when it is desired to draw the plates 13 and 14 closer together at their outer ends, in which latter event the flange 17 alone constitutes the spacing or abutting member. The plates 13 and 14 are reinforced respectively by outer plates or strips 20 and 21 respectively, the plates 20 and 21 being substantially coextensive in height with the clamping plates 13 and 14 and having at their inner edges outwardly curved lips 22 and 23 which generally follow the curvature of the inner ends of the jaws 15 and 16 for reinforcing and bracing the same.

The reinforcing plate 20 is preferably permanently attached to the clamping plate 13 by a rivet 24 or the like, and rivets 25 are preferably used for permanently securing the reinforcing plate 21 to the clamping plate 14. The plates 13 and 14 are adapted to be drawn toward each other by clamping bolts 26 having the usual nuts adapted to be turned up against the outer side of the adjacent clamping plate for binding the jaws 15 and 16 upon the upright 10.

The attaching means is provided with a pivotal support for the body of the wing or extension, and to this end one of the clamping plates, such as the plate 14, is bent abruptly and laterally in position to extend rearwardly when applied to the windshield. The bent portion, designated as 27 in the drawings, extends substantially 75° from the plane of the body portion of the plate 14. This portion 27 constitutes an arm, and the latter is provided with an arcuate socket 28 on its outer end which is substantially semi-cylindrical and formed by pressing or rounding the free edge portion of the arm 27. The socket 28 extends in a general vertical direction and is adapted to receive therein the intermediate cylindrical portion of a rod 29 adapted to turn in the socket. The rod 29 is adapted to be clamped in the socket 28 from turning therein by a suitable manually operable clamp, such as shown in detail in Fig. 4, and which comprises a sheet metal body plate 30 having at its upper and lower ends inturned flanges 31 suitably apertured for the passage of the rod 29 therethrough.

The plate 30 is reinforced by laterally inturned flanges 32 forming therebetween a channel within which are seated a pair of angularly faced nuts 33 threaded upon set screws 34, the latter having winged nuts or hand grips 35 upon their outer ends to facilitate turning of the set screws in the nuts 33. The set screws 34 pass through openings formed in the body plate 30 and are held in line with the rod 29 and are adapted to bind against the side of the socket 28 for securing the rod from turning in the socket.

The wing body comprises a transparent pane 36 of glass or the like which is of suitable height, width, and thickness, and which is connected to the rod 29 to turn therewith by an improved clamp which eliminates boring or drilling of holes through the pane 36.

The clamp is in the form of a pair of plates 37 and 38 which may be of less vertical length than the pane 36 and which have outer straight edge portions 39 and 40, the edge 39 being turned inwardly toward the edge 40 and provides an abutting flange of a width substantially equal to that of the pane 36. The inner edges of the plates 37 and 38 are recessed to provide pairs of upper and lower arms 41 and 42 adapted to extend over the opposite sides of the pane 36 a distance sufficient to obtain the desired grip of the plates 37 and 38 upon the pane 36.

The arms 41 and 42 are preferably reinforced by outwardly pressed beads 43 which extend horizontally along the arms 41 and 42 and which terminate at their inner ends in substantially disk like bosses 44 also pressed outwardly from the plates 37 and 38. The bosses 44 are apertured, and clamping bolts 45 are passed through the apertures and drawn taut through the plates by clamping nuts 46 or the like. The bosses 44 afford a firm support for the heads of the bolts 45 and for the clamping nuts 46.

The inner faces of the clamping plates 37 and 38 are preferably provided with flexible and yieldable linings 47 of rubber or the like adapted for immediate contact with the opposite sides of the pane 36 for affording a firm grip upon the pane and to prevent injury thereto or uneven distribution of pressure of the plates 37 and 38 upon the pane.

One of the plates, such as the plate 37, is provided at its upper and lower ends with out-turned ears 48 which extend in the same direction and in vertical alinement and are provided with suitable apertures through which the opposite ends of the rod 29 extend. The rod 29 is screw threaded at opposite ends and provided upon each end with a pair of clamping nuts 49 adapted for binding engagement against the opposite sides of the adjacent ears 48. The flanges 31 of the pivotal clamp 30 are disposed upon the rod 29 at the upper and lower ends of the socket 28 and the rod 29 is supported through the flanges 31 and socket 28 by a stop collar 50 which is secured in adjusted position lengthwise of the rod 29 by a set screw 51 and which is adapted to bear against the upper flange 31 and support the rod and the parts carried thereby.

The ears 48 are secured upon the rod in a manner to prevent turning of the ears on the rod so that when the rod is clamped in the socket 28 the body clamp for the pane 36 is held from swinging upon the support.

In operation the support, comprising the clamping plates 13 and 14 and their adjacent parts, is secured to the upright 10 at the side of the windshield. If the upright 10 is relatively thick, the spacing plate 18 is employed for spacing apart the inner ends of the plates 13 and 14 a relatively great distance, while if the upright 10 is thin and of small diameter the plate 18 is removed so that the flange 17 holds the plates 13 and 14 in closely spaced apart relation. These spacing members 17 and 18 are thus selectively used for determining the space between the clamping jaws 15 and 16 and thus adapt the attaching bracket or member to windshield frames of different sizes. When the supporting or attaching member is thus applied to the windshield the pane 36 may be swung into the desired angular position with respect to the windshield upon loosening the set screws 34, the wing or pane 36 being supported on the collar 50 and being adapted to be easily swung into any position desired.

As soon as the desired pivotal position is obtained the set screws 34 may then be turned up against the socket 28 to bind the rod 29 in the adjusted position. The wing 36 may be adjusted vertically by varying the position of the stop collar 50 upon the rod 29 so that air currents may be directed into or deflected from the vehicle body at the desired height.

In Fig. 2 the arrow 52 indicates the direction of travel of the vehicle to which the windshield is applied and in the full line position of the wing 36, the latter is adapted to catch and deflect air currents from the opposite sides of the windshield into the body of the automobile behind the windshield.

The dotted line position of the wing 36 shown in Fig. 2 indicates another adjustment of the wing wherein the air currents, rain or the like are deflected from the sides of the windshield and from the open side of the vehicle. It is, of course, apparent that the wing 36 may be swung into various other angles, such as into an angle wherein the spacing flange 39 of the clamp for the transparent pane engages the rear side of the windshield. In such position the wing 36 forms substantially a right angle extension from the windshield to close in the side of the windshield.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. In a wing attachment for windshields, a clamp adapted for adjustable mounting upon a windshield frame and having an outwardly projecting arm with a forwardly opening socket in the outer end of the arm and extending vertically therein, a wing body, a vertically disposed rod spaced from and carried by the body and adapted to be moved laterally into and out of said socket, a clamping yoke slidably mounted on said rod adapted for adjustment from end to end thereof and being of slightly greater length than the socket whereby to engage across the opposite ends of the socket, and clamping screws carried by said yoke intermediate the ends of the same and adapted to be turned up against the closed side of said socket for binding the rod therein in various vertical adjusted and turned positions, whereby to support said wing body at different angles and heights upon the body of the windshield.

2. In a wing attachment for windshields, a clamping member including jaws and contracting means therefor adapted for engagement upon the standard of a windshield and provided with an outstanding semicylindrical socket, a wing body, supporting means therefor including a pair of laterally extending arms, a rod secured at opposite ends in said arms and adapted to slidably and removably fit in said socket, a yoke carried by said rod and slidable thereon between said arms and arranged to receive said socket therein, and clamping members carried by the yoke for binding engagement against the outer side of the socket whereby to clamp said rod therein and hold the rod from turning in the socket and from sliding longitudinally through the yoke.

In testimony whereof, I have affixed my signature in presence of two witnesses.

ALEXIS F. GILLET.

Witnesses:
 ARTHUR H. STURGES.
 HIRAM A. STURGES.